United States Patent [19]

Hall

[11] Patent Number: 4,583,253

[45] Date of Patent: Apr. 22, 1986

[54] BABY SLEEPER FOR AUTOMOBILES

[76] Inventor: Dennis E. Hall, 18001 Cantara St., Reseda, Calif. 91335

[21] Appl. No.: 701,989

[22] Filed: Feb. 15, 1985

[51] Int. Cl.$^4$ .................. A47D 7/04; A47C 27/08
[52] U.S. Cl. ..................................... 5/94; 5/424; 5/455; 297/250
[58] Field of Search ............ 5/94, 118, 455, 449, 5/424; 297/250

[56] References Cited

U.S. PATENT DOCUMENTS

| | | | |
|---|---|---|---|
| 3,003,164 | 10/1961 | Calvelage | 5/94 |
| 3,619,825 | 11/1971 | Taub et al. | 5/94 |
| 3,833,946 | 9/1974 | Von Wimmersperg | 5/94 |
| 3,833,947 | 9/1974 | Sorensen | 5/94 |
| 4,366,587 | 1/1983 | Takada | 5/94 |

Primary Examiner—Alexander Grosz
Attorney, Agent, or Firm—Erik M. Arnhem

[57] ABSTRACT

A baby sleeper mountable on an automobile seat in conjunction with an existing standard seat belt, comprising a base having a surrounding inflatable tubular wall; an arrangement of straps mounted on the underside of the base, terminating in aligned loops through which the existing seat belt passes, one of the straps terminates in an oppositely located hook attachable to the automobile seat; an additional strap mounted over and across the tubular base wall; and a harness for holding the baby, mounted onto the additional strap.

8 Claims, 5 Drawing Figures

BABY SLEEPER FOR AUTOMOBILES

BACKGROUND OF THE INVENTION

FIELD OF THE INVENTION

My invention refers to a novel baby sleeper mountable, in conjunction with a standard seat belt, on the seat of an automobile.

The invention is of particular importance when the driver is alone with a baby in the car and for safety reasons must keep the eyes on the traffic passing all round the car, and both hands on the steering wheel. In general, wrapping a two or three point seat belt arrangement around the sleeper, without additional safeguards is inadequate, as the baby, in the event of an accident, obviously is incapable of taking any preventive action and a violent impact, e.g., between two cars may cause the sleeper to slip or slide out of the grip of the seat belt, as the latter can only be applied tautly to space portions of the sleeper not directly occupied by the baby.

SUMMARY OF THE INVENTION

In addition to what was stated above, the baby sleeper, according to the invention, is provided with a combination of looped straps being adjustable for use with a conventional seat belt arrangement in a car, in order to firmly anchor the sleepr and holding it down to the seat as the car crashes. Although the holding system of the sleeper may stretch a little to soften the impact on the baby, it is obvious that as little slack as possible should be present in the system and the loads in the latter should build up to a tolerable level as soon as possible. The sleeper is designed to accomplish the above objectives.

The sleeper is provided with further protective measures such as an air inflatable walled enclosure being integral part of and surrounding a padded resting base, and a looped harness for the arms, legs and torso of the baby, which is integrated with the strap system of the sleeper.

Additionally for the sake of safety and comfort, the bottom of the sleeper is furnished with tubular air pockets.

The inflatable wall portion of the sleeper presents additional advantages, such as facilitating the removal of the baby when deflating the sleeper wall, and besides saving space when in a deflated state.

It is thus an object of the invention to provide a baby sleeper with a separate systems of straps and using the existing seat belt in a car as auxiliary means to maintain the baby securely in the sleeper.

It is a further object of the invention to provide a sleeper which incorporates air inflatable section for the additional protection and safety of the baby.

It is still a further object to provide an inflatable baby sleeper which is space saving and inexpensive to manufacture.

DESCRIPTION OF THE INVENTION

Figure 1:
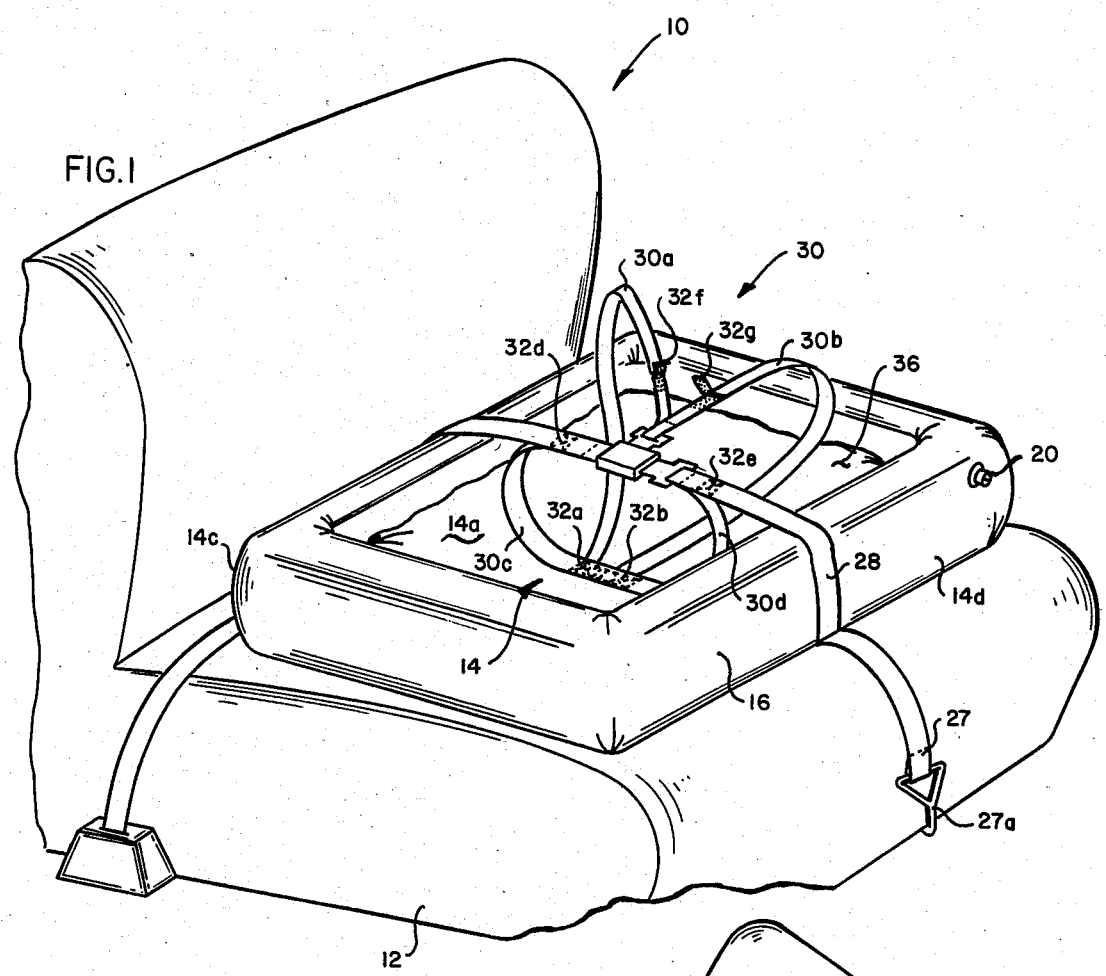
FIG. 1 is a top perspective view of the sleeper for a baby according to the invention.
Figure 2:
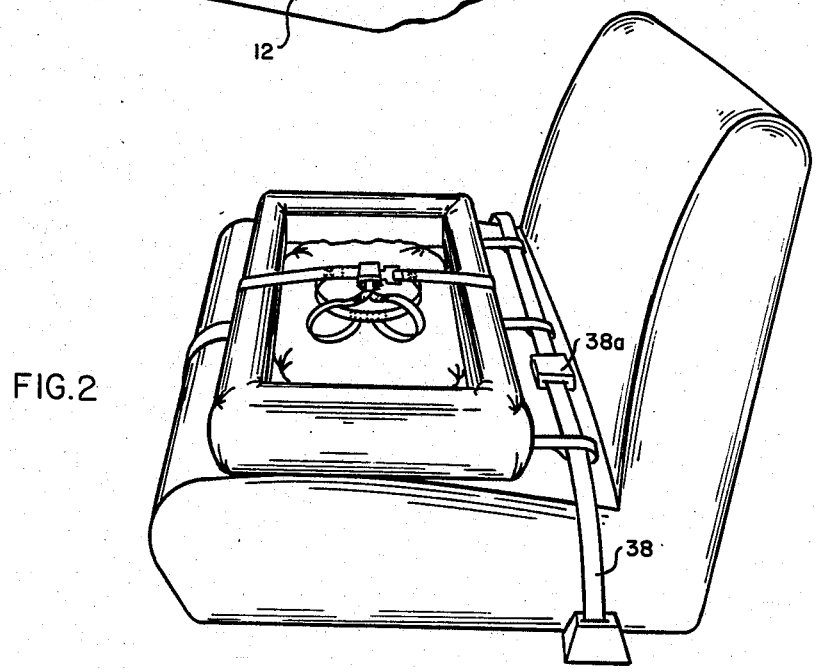
FIG. 2 is another perspective view of the sleeper.
Figure 3:
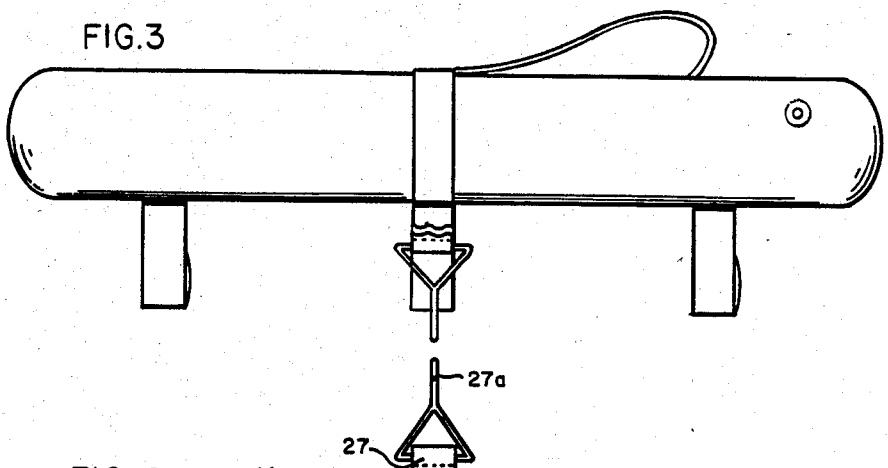
FIG. 3 is a front elevational view of the sleeper.

In the drawings like reference characters designate similar parts in the several views of the drawings.

In FIG. 1, numeral 10 indicates the sleeper in its entirety, suitably mounted on a front seat 12 of an automobile adjacent to the driver's seat.

The sleepr 10, supporting the baby, has a, preferably four sided flat base 14, made in its entirety of a synthetic plastic or elasticized material. The four merging edges of base 14 are, respectively rolled upwardly to form an inflatable tubular wall, and then heat sealed airtight to and surrounding base surface 14a, so as to provide an enclosure 16 with an air inflator valve 20 for inlet (inflating) and outlet (deflating) of air (FIG. 1).

Figure 4:
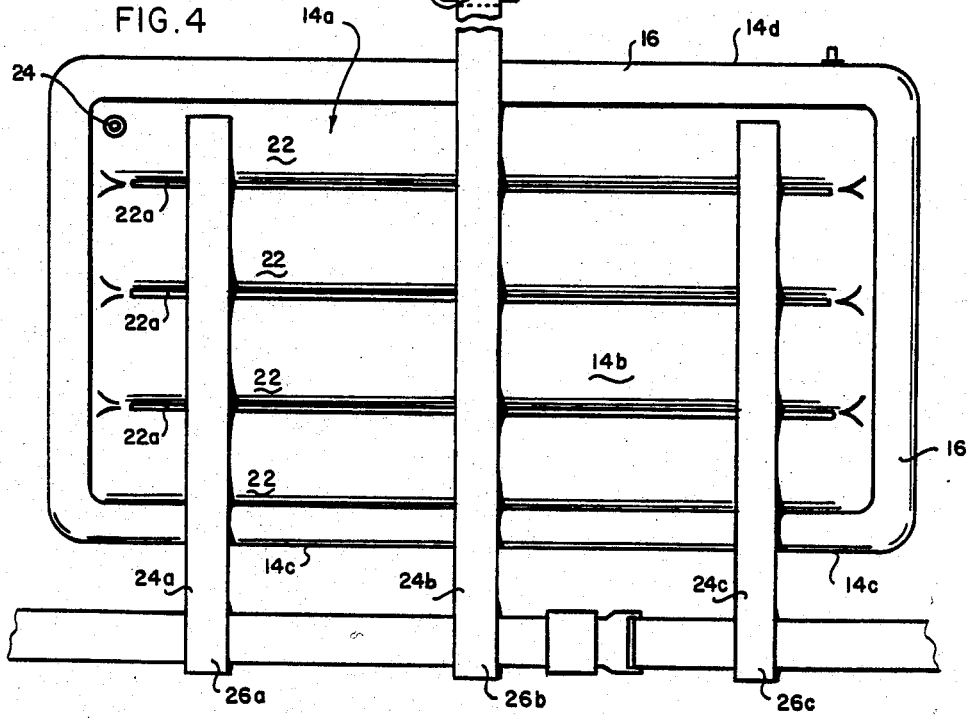
FIG. 4 is a bottom elevational view thereof.

Base underside 14b (FIG. 4) is provided with a mat of elongated inflatable tubular sections 22, which are disposed parallel next to one another and interconnected via narrow intermediary channels 22a so that they may be inflated (or deflated) simultaneously through another air inflator valve 24.

The mat of tubular sections 22 is, likewise made of a synthetic plastic material and heat sealed to base underside 14b within the area defined by tubular wall 16 and provides a cushioning support for the baby in the sleeper.

The sleeper is, furthermore provided with a first, second and third strap, respectively 24a, 24b, 24c which are heat sealed along their entire lengths, parallel and spatially apart from one another, onto and across tubular mats 22. Each of the straps 24a, b, c, projects beyond one (or a first) side 14c of base 14, respectively terminating in loops 26a, b and c. The opposite ends of straps 24a, 24c terminate within surrounding tubular wall 16; the other end of strap 24b, however protrudes beyond wall 16 at base side 14d, having an elastic strap end section 27 sewn (or otherwise fastened) thereto, terminating in a hook 27a preferably made of rigid synthetic plastic material.

A fourth strap 28 is wrapped over base surface 14a, resting on opposite sides of tubular wall 16 and in alignment with strap 24b. Strap 28 is sewn or heat sealed to strap 24b.

Harnessing means, e.g., harness 30, comprises first and second straps forming loops, respectively 30a, b, and 30c, d.

Loops 30a, b substantially form an "M" with its ends mounted, preferably by sewing, spatially apart to center portions of strap loops 30c, d at 32a, b. The center slanting portions of loops 30a, b are provided with openable/closable fastening elements, such as hook and loop sections 32f, g, e.g., as sold commercially under the trademark VELCRO, and merge into a single strp 32c. The ends of strps forming loops 30c, d, are fastened, preferably by sewing, onto strap 28 at 32d, e.

The hook-and-loop arrangements oppositely one another at 32f, g, are provided to facilitate the placing of the baby within and removal from the harness.

Figure 5:
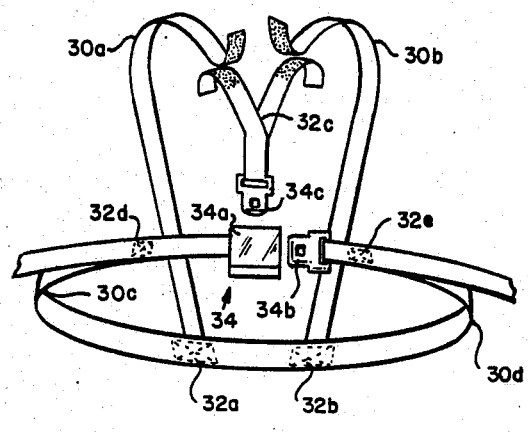
FIG. 5 is a detailed enlarged view of the harness holding the baby in the sleeper.

Center portions of strap 28 are openable/closable by means of a seat belt buckle system 34, with a catch 34a having a two-way inlet receiving releasably insert 34b, and insert 34c at the end of strap 32c (FIG. 5).

Buckle system 34 when closed by locking inserts 34b, c into catch 34a (holding the baby securely in the harness) is believed to meet current federal safety regulation for such harnesses.

Straps 24, 28, 30a, b and 30c, d are, preferaby made of sturdy webbing or nylon material.

A soft removable cotton pad (also usable as cover) may be placed within sleeper 10 on base surface 14a.

Securing sleeper 10 onto the automobile seat is carried out as follows:

A seat belt 38 with a conventional interlocking catch and insert elements (being standard equipment in most cars) is brought through loops 24a, b, c of sleeper 10 and locked at 38a.

Finally, hook 27a on resilient strap portion 27 is pulled downwardly and hooked under seat 12 (FIG. 1).

Preferred dimensions of the sleeper is as follows:
Length of tubular wall (16): 32"
Height of tubular wall: 7" (when inflated)
Width of tubular wall: 3" (when inflated)
Length of area within tubular wall: 26"
Width of area within tubular wall: 14"
Diameter of tubular sections of mat: 2½"

While the foregoing has illustrated and described what is now contemplated to be the best mode of carrying out the invention, the description is, of course, subject to modifications without departing from the spirit and scope of the invention.

Therefore, it is not desired to restrict the invention to the particular constructions illustrated and described, but to cover all modifications that may fall within the scope of the appended claims.

I claim:

1. A baby sleeper, mountable on an automobile seat in conjunction with an existing standard seat belt buckle arrangement, comprising in combination:
   (a) a four-sided base, having an upper surface, an underside and merging edges, which are rolled upwardly and heat sealed airtight to and surrounding the base, so as to form a tubular inflatable walled enclosure for placing the baby therewithin;
   (b) an air inflator valve mounted on the tubular enclosure for inflating thereof;
   (c) a first, second and third strap, heat sealed parallel spatially apart from one another onto the underside of the base, each strap terminating in a loop, respectively projecting from a first side of the base, within which the existing seat belt buckle arrangement passes and interlocks, the second strap, at least portion of which is resilient, extending beyond a second opposite side of the base terminating in a hook, attachable to the automobile seat;
   (d) a fourth strap, wrapped over the upper surface and resting on opposite sides of the tubular enclosure of the base in alignment with and having its ends heat sealed at least to the second straps;
   (e) harnessing means, mounted to the fourth strap for securing the arms, legs and torso of the baby.

2. A baby sleeper, according to claim 1, wherein the center portions of the fourth strap are openable and closeable by means of a seat belt catch having a two-way inlet, and an insert interlockable with one of the inlets.

3. A baby sleeper, according to claim 2, wherein the harnessing means consists of a first substantially M-shaped strap forming loops, the free ends of which are mounted spatially apart to center portions of a second strap forming loop, the center portions of the first strap forming loops terminating in a seat belt insert interlockable with the other inlet of the seat belt catch, the ends of the second strap forming loop being mounted to the fourth strap of the sleeper, respectively at each side of the seat belt/catch insert thereof.

4. A baby sleeper, according to claim 3, wherein opposite sections of the center portions of the first strap forming loops are, respectively provided with closable and openable hook and loop arrangements to facilitate the placing of the baby within and removal from the harnessing means.

5. A baby sleeper, according to claim 1, wherein the base underside is provided fixedly with a mat of elongated inflatable tubular sections, arranged parallel next to one another and interconnected via intermediary channels extending parallel there between, and an air inflator valve mounted on the mat so that the tubular sections may be inflated or deflated simultaneously.

6. A baby sleeper, according to claim 5, wherein the mat and base of the sleeper are made of synthetic plastic material.

7. A baby sleeper, according to claim 5, wherein the mat and base are made of elasticized material.

8. A baby sleeper, according to claim 1, wherein a soft pad is placeable on the base surface of the sleeper.

* * * * *